United States Patent [19]

Sauer et al.

[11] Patent Number: 5,385,971

[45] Date of Patent: Jan. 31, 1995

[54] METHOD OF PRODUCING AQUEOUS POLYMER DISPERSIONS

[75] Inventors: Thomas Sauer, Haltern; Bernhard Stützel, Marl, both of Germany

[73] Assignee: Huels Aktiengesellschaft, Marl, Germany

[21] Appl. No.: 35,203

[22] Filed: Mar. 22, 1993

[30] Foreign Application Priority Data

Apr. 16, 1992 [DE] Germany ............... 4212768

[51] Int. Cl.6 ............................................. C08L 33/02
[52] U.S. Cl. ........................... 524/558; 524/376; 524/458; 524/460; 524/556; 524/560
[58] Field of Search ............... 524/558, 556, 560, 376, 524/458, 460

[56] References Cited

U.S. PATENT DOCUMENTS

| | | | |
|---|---|---|---|
| 3,790,520 | 2/1974 | Ludwig | 524/376 |
| 3,849,361 | 11/1974 | Zweigle | 524/376 |
| 5,191,014 | 3/1993 | Roberts et al. | 524/831 |

FOREIGN PATENT DOCUMENTS 0013478 7/1980 European Pat. Off. .
2754140 6/1979 Germany .

*Primary Examiner*—Paul R. Michl
*Assistant Examiner*—John J. Guarriello
*Attorney, Agent, or Firm*—Oblon, Spivak, McClelland, Maier & Neustadt

[57] ABSTRACT

Method of producing sterically stabilized polymer dispersions by polymerizing ethylenically unsaturated monomers in an aqueous phase (as a dispersion medium) in the presence of an initiator system and a water-soluble macromonomer which is an esterification product of maleic acid, fumaric acid, maleic anhydride, or mixture thereof and polyalkylene glycols and/or monoalkyl ether of polyalkylene glycol, having a degree of esterification between 50% and 100%. The dispersions obtained according to this method possess high electrolyte stability, shear stability, and frost stability, even without addition of conventional emulsifiers and emulsification adjuvants.

10 Claims, No Drawings

METHOD OF PRODUCING AQUEOUS POLYMER DISPERSIONS

BACKGROUND OF THE INVENTION

1. Field of the Invention

The invention relates to a method of producing sterically stabilized aqueous dispersions of polymers using macromonomers which are esterification products of maleic acid or fumaric acid and polyethylene glycol and/or monoalkyl ether of polyethylene glycol.

2. Discussion of the Background

The use of a polyoxyethylene-containing maleic acid ester as a stabilizer for an aqueous polymer dispersion is known. For example, German OS 27 54 140 discloses polymeric emulsifiers obtained by reacting polybutadiene-maleic anhydride copolymers with polyethylene glycols and/or monoalkyl ethers of polyethylene glycol. However, the production of such a comb polymer is a multi-step process which involves producing the polymeric fundamental structure and then reacting with polyethylene glycol and/or its monoalkyl ether derivative. It is very difficult to control the product, particularly in this last reaction.

Accordingly, it is desirable to directly synthesize a surface-active comb polymer. German OS 15 70 805 and European OS 0,248,612 describe hydrophobic monomers copolymerized with ethylenically unsaturated derivatives of polyethylene glycol. However, this process suffers from the disadvantage that the protective colloid must be produced in a separate reaction, which is costly. This disadvantage can be avoided by producing the protective colloid in situ at the time of the emulsion polymerization.

European OS 0,013,478 describes a method wherein ethylenically unsaturated hydrophilic oligomers and/or polymers, generally based on (meth)acrylic acid esters and commonly referred to as "macromonomers", are copolymerized with additional monomers in an aqueous phase. The known incompatibility of the polyoxyethylene chains with the predominantly hydrophobic polymer main chains, along with a statistical incorporation of the macromonomers, ensures their distribution over the surface of the latex particles, resulting in stabilization of the polymer dispersion.

According to European OS 0,013,478, the statistical incorporation of macromonomers based on (meth)acrylate esters entails difficulties when the polymerization is carried out in a purely aqueous emulsion without using an organic cosolvent. When a water-soluble initiator is employed, these water-soluble macromonomers homopolymerize in a purely aqueous phase, resulting in poor stabilization of the latex particles. As a result, the method according to European OS 0,013,478 employs added organic cosolvents.

In addition, such macromonomers based on (meth)acrylic acid are produced using an inhibitor in order to avoid polymerization during the condensation reaction. These inhibitors must then be removed, at additional cost, to prevent their interference with the subsequent emulsion polymerization.

The good water-solubility of the macromonomers is not disadvantageous if they do not homopolymerize. If such a condition exists, one can compensate for unfavorable concentration ratios of the comonomers in the aqueous phase. In this connection, the advantageous copolymerization behavior of maleic acid and its derivatives is known. German Patent No. 1,100,958 disclose polyoxyethylene-containing maleic acid monoesters or mixed maleic acid polyethylene glycol alkyl esters as comonomers in producing polymer dispersions. In order to achieve a good emulsification effect, long chain substituted omega-alkyl polyethylene glycols or omega-(alkylaryloxy) polyethylene glycols are used which are strongly surface active. However, such additives must be produced in a separate multistage chemical reaction process which is costly and time consuming.

German OS 33 90 093 disclose aqueous polymer dispersions produced without the usual suspending or emulsifying agents. The dispersions contain a polymer which is a copolymer of at least one amphipathic and at least one nonamphipathic monomer. The lipophilic component of the amphipathic monomer has a molecular weight of at least 100 and contains at least one ethylenic double bond. If one produces the amphipathic monomer starting with maleic acid or fumaric acid, the necessary lipophilic character can be conferred by converting it into derivatives having hydrocarbon chains, e.g., by esterification with fatty alcohols to the monoester stage. In addition a polymeric water-insoluble component such as polyoxypropylene or polyoxybutylene can be grafted thereon. Example 4 of the above-cited document apparently combines both techniques.

The amphipathic monomers used according to German OS 33 90 093 have an emulsifying effect. Due to the naturally incomplete incorporation in the polymerization, the latex always contains a residual amount of such molecules, which makes it difficult to achieve a high surface tension necessary for certain applications. A further disadvantage results from the fact that such latexes tend to be substantial foam-formers.

SUMMARY OF THE INVENTION

Accordingly, one object of the invention is to provide a method for producing an aqueous dispersion of polymers possessing high electrolyte stability, shear stability, and frost stability, and can be adjusted to display a wide range of viscosities without the addition of customary emulsifiers and emulsification adjuvants.

It is a further object of the invention that the resulting dispersions should be capable of being produced in a form which is free of organic cosolvents.

Accordingly, these problems can be solved by providing a method wherein ethylenically unsaturated monomers are polymerized in an aqueous phase in the presence of a water-soluble macromonomer and an initiator system, wherein the macromonomer is an esterification product of maleic acid, fumaric acid, maleic anhydride, or mixture thereof and a polyalkylene glycol, monoalkyl ether of polyalkylene glycol, or mixture thereof having a degree of esterification between 50% and 100%.

DETAILED DESCRIPTION OF THE PREFERRED EMBODIMENTS

Suitable polyalkylene glycol components include polyethylene glycol, monoethers of polyethylene glycol having a lower alkyl group, or mixture thereof. As a general rule, the mean degree of polymerization should be between 5 and 500, and the alkyl group should have at most 6 C atoms. The alkylene portion of the polyalkylene component may have 2-6 C atoms, preferably 2 C atoms. Preferably, the alkyl group has at most 4 C atoms. Ethoxylated derivatives of long-chain fatty alcohols, phenols, or alkylated phenols may be used for producing the inventive macromonomers.

A macromonomer based on maleic acid is produced by reacting maleic anhydride and polyethylene glycol, or a short-chain monoalkyl ether of polyethylene glycol, or mixture thereof at an elevated temperature. The resulting monoester may be converted to a diester using an acid catalyst. The degree of esterification is determined by stoichiometry and reaction conditions.

It is possible but not necessary to employ a solvent in the reaction. Advantageously the reaction is carried out in the mass. The degree of esterification of the products may be varied between 50 and 100% by changing the reaction parameters, and can be adjusted by subsequently adding monoesters and/or diesters. This production method employing per se known methods of esterification may preferably be carried out as a preliminary reaction to the emulsion polymerization in the same reaction vessel. It is not necessary to use an inhibitor during the esterification step.

Particularly preferred macromonomers include maleic acid esters of polyethylene glycols and maleic acid esters of monomethyl ethers of polyethylene glycol having a mean degree of polymerization between 40 and 500 and a degree of esterification between 50 and 100%.

The emulsion polymerization is preferably carried out in the presence of the above-described macromonomers without the addition of emulsifiers or emulsification adjuvants. It is now possible to successfully produce polymer dispersions by the method according to the invention even though such macromonomers do not by their nature possess surface active properties.

The maleic acid esters are preferably used in an amount of 1–15 wt. %, particularly preferably 3–12 wt. %, based on the total amount of monomers. They may be used in pure form or as a mixture of various derivatives. Also, in order to achieve certain parameters one may employ customary additives in the form of anionic, cationic, or nonionic emulsifiers or protective colloids. However, such additives are not necessary for successfully producing polymer dispersions according to the invention.

Suitable monomers for the polymerization includes ethylenically unsaturated compounds such as ethylene and alkyl- or aryl-substituted monoolefins such as propylene, styrene, and alpha-methylstyrene, multiple unsaturated olefins such as butadiene and isoprene, alkyl vinyl ethers having linear or branched alkyl groups, starting with aliphatic carboxylic acids with 2–18 C atoms, preferably vinyl acetate, vinyl butyrate, or commercially widely available alpha-branched C9 and/or C10 carboxylic acid vinyl esters. In addition, the alkyl esters of (meth)acrylic acid with linear and branched alkyl groups with 1–18 C atoms, preferably methyl (meth)acrylate, ethyl (meth)acrylate, linear and branched butyl (meth)acrylate, and ethylhexyl (meth)acrylate are suitable. Also suitable are vinyl chloride, acrylonitrile, and the alkyl esters of other ethylenically unsaturated acids such as fumaric, maleic, and itaconic acid. Furthermore, additional water-soluble monomers such as (meth)acrylic acid, (meth)acrylamide, and hydroxyalkyl derivatives of (meth)acrylic acid such as hydroxyethyl (meth)acrylate, which are frequently employed as comonomers. For specific applications, known crosslinking agents may be employed. The polymerization can be carried out batchwise, semicontinuously (in a "continuous feed" process), or completely continuously. When a plurality of monomers are used, they may be added to the polymerization vessel as individual components or in a mixture.

Particularly preferred monomers are styrene, butadiene, and alkyl (meth)acrylates having 1–8 C atoms in the alkyl chain. Particularly preferred comonomers are (meth)acrylic acid and (meth)acrylamide.

In the case of the emulsion polymerization, initiation is with conventional radical-forming agents. Thermally decomposing peroxides, hydroperoxides, or azo initiators may be used for this purpose. These initiators may be soluble in water or in the monomer(s), and may be used alone or in a mixture. In addition, suitable reducing agents such as sodium formaldehyde sulfoxylate, sodium and potassium sulfite and/or -bisulfite, and ascorbic acid, may be used for controlling the decomposition of the initiator. Preferred initiators are sodium peroxydisulfate and tert-butyl hydroperoxide, the latter preferably in combination with sodium formaldehyde sulfoxylate as a reducing agent. Initiators and reducing agents are employed in a total amount of 0.01–3.5 wt. % (based on the total amount of monomers).

In addition, water-soluble or oil-soluble regulators may be used to influence the crosslinking and the content of gel particles. Suitable regulators are mercaptans, preferably dodecyl mercaptan, or triethanolamine. These are used in an amount of 0.01–3 wt. % (based on the total amount of monomers).

The emulsion polymerization is carried out in a customary polymerization reactor. Initiators, maleic acid macromonomers, any water-soluble comonomers used, and regulators, are charged to the reactor along with water. The principal monomer (or mixture of monomers) may be added in toto before the start of the reaction, or may be added during the reaction, portionwise, continuously, or preferably semicontinuously ("continuous feed method"). The initiators, or part of the initiator system, preferably the reducing agent, may be dosed in the feed. Ordinarily the polymerization is carried out at 5°–95° C., preferably between 50° and 90° C. It is particularly preferred to carry out the polymerization reaction via a monomer feed method.

The polymerization can be conducted such that inventive polymer dispersions with solids content between 10 and 70 wt. %, preferably between 30–70 wt. % (based on the total weight of the dispersion) are obtained. The solids content is adjusted by adjusting the monomer to water ratio and/or by a subsequent concentration operation. The viscosity of the polymer dispersion may be adjusted over a wide range by suitable choice of the inventive macromonomers and the reaction conditions.

The inventive dispersions are advantageous because they possess a high stability under strongly alkaline conditions, particularly in cement. In addition, they have high electrolyte stability, shear stability, and frost stability, low coagulate concentration, and low residual monomer concentration. Polymer films obtained from the dispersions show high water resistance. They are therefore suitable for use as adhesives and as binders for all types of coatings and paints, as well as additives for hydraulically setting compositions such as concrete and cement mortar. The inventive dispersions are also suitable for the production of powder dispersions.

Another advantage of the described maleic acid macromonomers stems from their property of bringing about a further decrease in the concentration of coagulate when used as additives in the production of customary anionically stabilized dispersions.

Other features of the invention will become apparent in the course of the following descriptions of exemplary embodiments which are given for illustration of the invention and are not intended to be limiting thereof.

EXAMPLES

The viscosities identified below were determined with a Brookfield viscosimeter. Parts by weight are abbreviated "pbw" and weight percent "%".

Maleic Acid Macromonomers

The macromonomers used in the following Examples are identified in Table I below. Each macromonomer was produced by heating equimolar amounts of maleic anhydride and polyethylene glycol (PEG) derivative at 80° C. for 1 hour. The monoesters produced thereby were reacted when necessary with one additional equivalent of polyethylene glycol or monomethyl ether of polyethylene glycol (MME), and 0.5% conc. sulfuric acid, at 140° C. for an additional 2–4 hours to form the diesters.

TABLE I

| Macro-monomer | PEG derivative (MME = monomethyl ether) | Mean number of ethyleneoxy units | Degree of esterification |
|---|---|---|---|
| 1 | PEG-MME | 45 | 65 |
| 2 | PEG | 455 | 50 |
| 3 | PEG-MME | 43 | 80 |
| 4 | PEG | 45 | 50 |
| 5 | PEG | 45 | 100 |
| 6 | PEG | 136 | 65 |
| 7 | PEG-MME | 8 | 60 |

Example 1

Into a polymerization reactor equipped with dosing means and temperature control means, 80 pbw water, 0.8 pbw tert-butyl hydroperoxide, and 5 pbw macromonomer 1 (see Table I) were charged. At 70° C. a mixture of 80 pbw vinyl acetate and 20 pbw neodecanoic acid vinyl ester ("VeoVa 10", supplied by Shell) was added portionwise over 3 hr, and a solution of 0.6 pbw sodium formaldehyde sulfoxylate in 30 pbw water was added portionwise over 4 hr. After an additional 2 hr, a dispersion with a solid content of 46.9% and a viscosity of 20 mPa sec was obtained.

Example 2

Example 1 was repeated but the macromonomer in the initial charge was 5 pbw of macromonomer 2 (see Table I). The resulting dispersion had a solids content of 46.8% and viscosity of 1200 mPa sec.

Examples 1 and 2 demonstrate the effect of the molecular weight of the macromonomer on the latex viscosity.

Example 3

Into a polymerization reactor equipped with dosing means and temperature control means, 85 pbw water, 0.8 pbw tert-butyl hydroperoxide, 2 pbw acrylamide, and 5 pbw macromonomer 3 (see Table I) were charged. At 70° C. a mixture of 40 pbw styrene and 60 pbw n-butyl acrylate was added portionwise over 3 hr, and a solution of 0.6 pbw sodium formaldehyde sulfoxylate in 30 pbw water was added portionwise over 5 hr. After an additional 2 hr, a dispersion with solids content 49.2% and viscosity 320 mPa sec was obtained.

Example 4

Example 3 was repeated but the macromonomer in the initial charge was 5.25 pbw of macromonomer 2 (see Table I). The resulting dispersion had a solids content of 50.6% and a viscosity of 3360 mPa sec.

Example 5

Example 4 was repeated but the macromonomer in the initial charge was 10 pbw of macromonomer 2 (see Table I). The resulting dispersion had a solids content of 49.9% and viscosity of 8900 mPa sec.

Example 6

Examples 3–5 demonstrate the effect of the molecular weight and amount of the macromonomer on the latex viscosity.

Example 6

Example 3 was repeated but the macromonomer in the initial charge was 5 pbw of macromonomer 6 (see Table I). The resulting dispersion had a solids content of 48.4% and a viscosity 144 mPa sec.

Example 7

Example 3 was repeated but the macromonomer in the initial charge was 5 pbw of macromonomer 7 (see Table I). The resulting dispersion had a solids content of 46.1.% and a viscosity of 16 mPa sec.

Example 8

Into a polymerization reactor equipped with dosing means and temperature control means, 4.66 pbw of an ethoxylated mixture of C16 and C18 fatty alcohols (25 mol ethylene oxide per mol fatty alcohol) and 0.34 pbw maleic anhydride were reacted for 1 hr at 85° C. Thereafter 80 pbw water, 0.8 pbw tert-butyl hydroperoxide, and 2 pbw acrylamide were added. At 75° C. a mixture of 40 pbw styrene and 60 pbw n-butyl acrylate, and a solution of 0.6 pbw sodium formaldehyde sulfoxylate in 30 pbw water, were added portionwise over 3 hr. After an additional 2 hr, a dispersion with a solids content of 50.1% and a viscosity of 5600 mPa.-sec was obtained.

Example 9

Example 8 was repeated but the amount of the ethoxylated mixture of C16 and C18 fatty alcohols used was 2.8 pbw, and the amount of maleic anhydride used was 0.2 pbw. The resulting dispersion had solids content 49.9% and viscosity 1560 mPa sec.

Comparative Example

Example 8 was repeated but instead of carrying out the preliminary reaction of the ethoxylated fatty alcohol mixture with maleic anhydride, 5 pbw of the ethoxylated mixture of C16 and C18 fatty alcohols (25 mol ethylene oxide per mol fatty alcohol) was charged. The resulting dispersion had a solids content of 42.2% and was not thoroughly polymerized.

Examples 8 and 9 demonstrate a variant in which a macromonomer was produced in a preliminary reaction prior to the emulsion polymerization. The Comparative Example demonstrates that the emulsion polymerization product produced in the absence of maleic acid macromonomers under comparable conditions is unsatisfactory.

Example 10

Into a polymerization reactor equipped with dosing means and temperature control means, 45 pbw water, 0.8 pbw tert-butyl hydroperoxide, 5 pbw macromonomer 4 (see Table I), and 0.1 pbw NaOH were charged. At 70° C. a mixture of 10 pbw styrene and 90 pbw n-butyl acrylate, and a solution of 0.6 pbw sodium formaldehyde sulfoxylate in 10 pbw water, were added over 5 hr. After an additional 2 hr, a dispersion with a solids content of 66.0% and a viscosity of 1820 mPa sec was obtained.

Example 11

Example 10 was repeated, except that the amount of water in the initial charge was 80 pbw. The resulting dispersion had a solids content of 49.1% and a viscosity of 14 mPa sec.

Example 12

Example 10 was repeated except that the amount of water contained in the initial charge was 80 pbw, the amount of NAOH was 2.3 pbw, and additionally the charge contained 4 pbw acrylic acid. The resulting dispersion had a solids content of 50.0% and a viscosity of 1200 mPa sec.

Examples 10–12 demonstrate the effect of the solids content and the presence of water-soluble comonomers on the latex viscosity. The particle sizes were between 350 and 600 nm.

Example 13

Into a polymerization reactor equipped with dosing means and temperature control means, 160 pbw water, 1 pbw sodium peroxydisulfate, 1.6 pbw tert-butyl hydroperoxide, 12 pbw macromonomer 1 (see Table I), 0.2 pbw tert-dodecylmercaptan, and 2 pbw acrylamide were charged. At 75° C. a mixture of 6 pbw styrene and 4 pbw butadiene was added to the reactor, and after 1 hr:

another portion of said mixture amounting to 54 pbw styrene and 36 pbw butadiene was added in a continuous feed over the next 3 hr, along with a solution of 0.6 pbw sodium formaldehyde sulfoxylate in 40 pbw water which solution was added in a continuous feed over a period of 4 hr.

After an additional 5 hr, a dispersion with solids content of 34.0% and a viscosity of 120 mPa-sec was obtained.

Example 14

Example 13 was repeated, except for the following differences: 190 pbw water, 8 pbw macromonomer 5 (see Table I), and 4 pbw acrylamide were present in the initial charge. At 80° C. a mixture of 6 pbw styrene and 4 pbw butadiene was added to the reactor, and after 1 hr:

another portion of said mixture amounting to 54 pbw styrene and 36 pbw butadiene was added in a continuous feed over the next 4 hr, along with a solution of 0.8 pbw sodium formaldehyde sulfoxylate in 40 pbw water which solution was added in a continuous feed over a period of 6 hr.

The resulting dispersion had a solids content of 33.0% and a viscosity of 5600 mPa sec.

Example 15

Example 14 was repeated, but the amount of acrylamide in the initial charge was only 3 pbw. The resulting dispersion had a solids content of 32.2% and a viscosity of 260 mPa sec.

Example 16

Example 14 was repeated, but the amount of macromonomer 5 in the initial charge was only 6 pbw. The resulting dispersion had a solids content of 30.4% and a viscosity of 400 mPa sec.

Examples 13–16 demonstrate the effect of the amount of macromonomer and water soluble comonomer on the latex viscosity. The mean particle diameters were between 150 and 190 nm.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A method of producing a sterically stabilized polymer dispersion consisting essentially of polymerizing ethylenically unsaturated monomers in an aqueous dispersion medium in the presence of
   a water-soluble macromonomer and
   an initiator system;
wherein the macromonomer is an esterification product consisting essentially of maleic acid, fumaric acid, maleic anhydride, or mixture thereof and polyalkylene glycol or monoalkyl ether of polyalkylene glycol having a degree of esterification between 50% and 100%.

2. The method according to claim 1, wherein the polyalkylene glycol or monoalkyl ether of polyalkylene glycol is polyethylene glycol or a lower alkyl ether of polyethylene glycol.

3. The method according to claim 1 or 2, wherein the mean degree of polymerization of the polyalkylene glycol is between 5 and 500.

4. The method according to claim 3, wherein the mean degree of polymerization of the polyalkylene glycol is between 40 and 500.

5. The method according to claim 1, wherein the amount of macromonomer used is 1–15 wt. % of the total amount of monomers.

6. The method according to claim 5, wherein the amount of macromonomer used is 3–12 wt. % of the total amount of monomers.

7. The method according to claim 1, wherein the polymerization is carried out semicontinuously.

8. The method according to claim 1, wherein the initiator system comprises a hydroperoxide soluble in the ethylenically unsaturated monomers and a water-soluble reducing agent.

9. The method according to claim 1, wherein the alkyl group of the monoalkyl ether polyalkylene glycol has 1–4 C atoms.

10. A polymer dispersion produced according to the method of claim 1.

* * * * *